(12) United States Patent
Gottschall

(10) Patent No.: US 6,576,767 B1
(45) Date of Patent: Jun. 10, 2003

(54) METHOD FOR PRODUCING CONDENSATION COMPOUNDS

(75) Inventor: Klaus Gottschall, Heddesheim (DE)

(73) Assignee: Dr Gottschall Instruction Gesellschaft fuer Technische Chromatographie mbH, Ludwigshafen (DE)

( * ) Notice: Subject to any disclaimer, the term of this patent is extended or adjusted under 35 U.S.C. 154(b) by 0 days.

(21) Appl. No.: 10/018,567

(22) PCT Filed: Jun. 21, 2000

(86) PCT No.: PCT/EP00/05754

§ 371 (c)(1),
(2), (4) Date: Dec. 20, 2001

(87) PCT Pub. No.: WO00/78825

PCT Pub. Date: Dec. 28, 2000

(30) Foreign Application Priority Data

Jun. 21, 1999 (DE) .......................... 199 28 236

(51) Int. Cl.$^7$ .......................... C07D 403/12
(52) U.S. Cl. ...................... 548/435; 548/542
(58) Field of Search ................. 548/435, 542

(56) References Cited

U.S. PATENT DOCUMENTS

| | | | |
|---|---|---|---|
| 4,076,916 A | 2/1978 | Lagow | 526/43 |
| 4,175,073 A | 11/1979 | Carlsson et al. | 530/408 |
| 4,341,707 A | * 7/1982 | Ogura et al. | 548/435 |
| 4,463,139 A | 7/1984 | Berger | 525/329.1 |
| 4,714,768 A | * 12/1987 | Henklein et al. | 548/435 |
| 5,453,461 A | 9/1995 | Heiliger et al. | 525/54.1 |
| 5,582,955 A | 12/1996 | Keana et al. | 430/296 |
| 5,795,719 A | 8/1998 | Richard et al. | 435/6 |
| 2002/0076727 A1 | * 6/2002 | Cardone et al. | 435/7.1 |

FOREIGN PATENT DOCUMENTS

| | | |
|---|---|---|
| CH | 606196 | 10/1978 |
| CH | 606 196 | 10/1978 |
| DE | 43 41 524 | 6/1995 |
| EP | 0 698 620 | 12/1998 |
| FR | 2 382 489 | 9/1978 |
| WO | WO 95/15983 | 6/1995 |

OTHER PUBLICATIONS

Matsuoka et al., Chemical Abstracts, 107:237559, 1987.*

* cited by examiner

*Primary Examiner*—Fiona T. Powers
(74) *Attorney, Agent, or Firm*—Foley & Lardner

(57) ABSTRACT

Process for the preparation of a condensation compound by reaction of at least one functional group of a first low-molecular weight compound having at least two functional groups, with at least one functional group of at least one further, second low-molecular weight compound having at least two functional groups, and which can be identical to the first or different from the first low-molecular weight compound, with obtainment of a condensation compound, characterized in that at least one of the functional groups involved in this reaction has been activated before the reaction by reaction with a compound of the following structure (I)

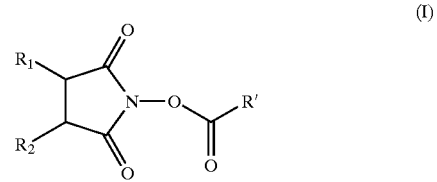

(I)

where R' is a halogen atom or a radical (I')

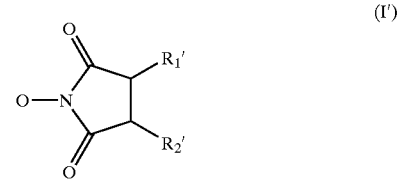

(I')

and where $R_1$, $R_2$, $R_1'$ and $R_2'$ are identical or different and are hydrogen, straight-chain or branched-chain alkyl, aryl, cycloalkyl, heterocyclic or aralkyl radicals having up to 30 C atoms, or either $R_1$ and $R_2$ or $R_1'$ and $R_2'$ or both $R_1$ and $R_2$ and $R_1'$ and $R_2'$ are linked to give a carbocycle or a heterocycle.

18 Claims, No Drawings

METHOD FOR PRODUCING CONDENSATION COMPOUNDS

The present invention relates to a process for the preparation of condensation compounds, starting from low-molecular weight compounds which have at least two functional groups and which have been activated by means of an activating reagent. Likewise, the present invention also relates to the use of such activating reagents for the preparation of the condensation compounds.

Condensation compounds such as polyamides, polyurethanes, polyesters, polycarbonates or polyureas have gained enormous importance as bulk plastics. They are employed here, inter alia, as synthetic fibres, moulded parts, packing materials or alternatively foams. These compounds are normally obtained by reaction of two divalent monomeric units in each case.

The reaction conditions under which these compounds are prepared are relatively drastic as a rule with respect to the temperature and the pH. However, this is a restriction which concerns the selection of the monomers from which the compounds are synthesized. Monomers which react sensitively to these drastic reaction conditions or monomers which carry substituents which react sensitively to these drastic reaction conditions can be employed with difficulty or not at all.

A further disadvantage of the drastic reaction conditions can be seen in that as a rule the condensations are unselective. Additional functional groups of a monomer unit in this case inevitably lead to undesired side reactions.

One object of the present invention was therefore to make available a process which does not have the disadvantages addressed.

Accordingly, the present invention relates to a process for the preparation of a condensation compound by reaction of at least one functional group of a low-molecular weight compound having at least two functional groups, with at least one functional group of at least one further low-molecular weight compound having at least two functional groups, and which can be identical to the first or different from the first low-molecular weight compound, with obtainment of a condensation compound, which is characterized in that at least one of the functional groups involved in this reaction has been activated before the reaction by reaction with a compound of the following structure (I)

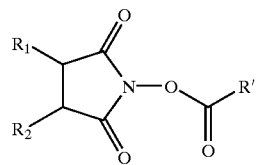

(I)

where R' is a halogen atom or a radical (I')

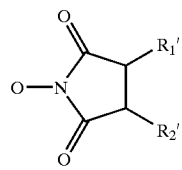

(I')

and where $R_1$, $R_2$, $R_1'$ and $R_2'$ are identical or different and are hydrogen, straight-chain or branched-chain alkyl, aryl, cycloalkyl, heterocyclic or aralkyl radicals having up to 30 C atoms, or either $R_1$ and $R_2$ or $R_1'$ and $R_2'$ or both $R_1$ and $R_2$ and $R_1'$ and $R_2'$ are linked to give a carbocycle or a heterocycle.

In a preferred embodiment of the present invention, a compound of the general structure (I) is employed in which the radical R' is a halogen atom, particularly preferably a chlorine atom. More preferably, in the compound of the general structure (I) used, the radicals $R_1$ and $R_2$ are bridged to give a carbocycle.

Accordingly, the present invention relates to a process, as described above, which is characterized in that the compound of the structure (I) employed is a compound of the following structure (II)

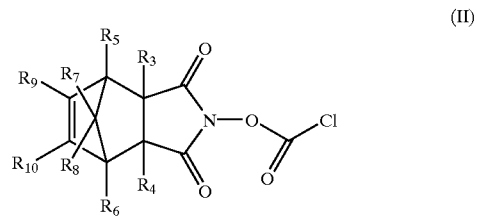

(II)

where $R_3$ to $R_{10}$ are identical or different and are hydrogen, straight-chain or branched-chain alkyl, aryl, cycloalkyl, heterocyclic and aralkyl radicals having up to 30 C atoms, or a number of $R_3$ to $R_{10}$ are bridged to give one or more carbocycles or heterocycles.

Obviously, in the content of the present invention, however, it is also possible that $R_1$ and $R_2$ are selected such that the bridgehead atom to which the radicals $R_7$ and $R_8$ are bonded in the structure (II) is a heteroatom. Depending on the type of heteroatom, it is possible here that one, two or alternatively a number of identical or different radicals $R_7$ and $R_8$ are bonded to the bridgehead atom. The bridgehead can obviously also be formed from a number of heteroatoms or a combination of heteroatoms and carbon atoms which, in turn, can optionally be substituted by one or more radicals of the type $R_7$ and $R_8$. In addition, structures are also possible which have an optionally substituted heteroatom instead of a carbon atom to which the radicals $R_5$ or $R_6$ are bonded in structure (II).

In a particularly preferred embodiment, the compound of the structure (II) employed is the following compound of the structure (III):

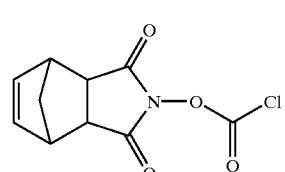

(III)

A compound of the general structure (I) which may be mentioned, which has a radical R' of the general structure (I'), is in particular the symmetrical carbonate of the following structure (IV):

(IV)

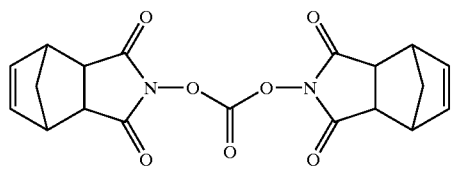

With respect to the low-molecular weight compounds having at least two functional groups, and which are reacted in the process according to the invention, no restrictions in general exist, as long as at least one of the functional groups can be activated with at least one compound of the above-mentioned compounds of the structures (I) to (IV).

The term "low-molecular weight compound", as is used in the context of the present invention, here includes compounds having a molar mass of less than 1000 daltons. Such compounds as a rule comprise up to approximately 20 monomer units.

The term "functional group", as is used in the context of the present invention, comprises all chemical structural elements which can react with one another or which can be activated with respect to this reaction by reaction with a compound of the structure (I) or (II).

Preferred functional groups of the low-molecular weight compounds having at least two functional groups which may be mentioned are, inter alia, OH groups, optionally substituted amine groups, SH groups, $OSO_3H$ groups, $SO_3H$ groups, $OPO_3H_2$ groups, $OPO_3HR_{11}$ groups, $PO_3H_2$ groups, $PO_3HR_{11}$ groups or COOH groups, the group $R_{11}$ being selected such that the functional group can be activated per se with a compound of the structure (I) or (II), or can be reacted with a functional group which is activated with a compound of the structure (I) or (II).

Low-molecular weight compounds having at least two functional groups which are possible are those which have functional groups of identical, preferably of the abovementioned, type. Likewise, low-molecular weight compounds having at least two functional groups and which comprise functional groups of different nature are also possible.

Below, examples of low-molecular weight compounds comprising at least two functional groups are listed in which two functional groups are activated with a compound of the structure (III):

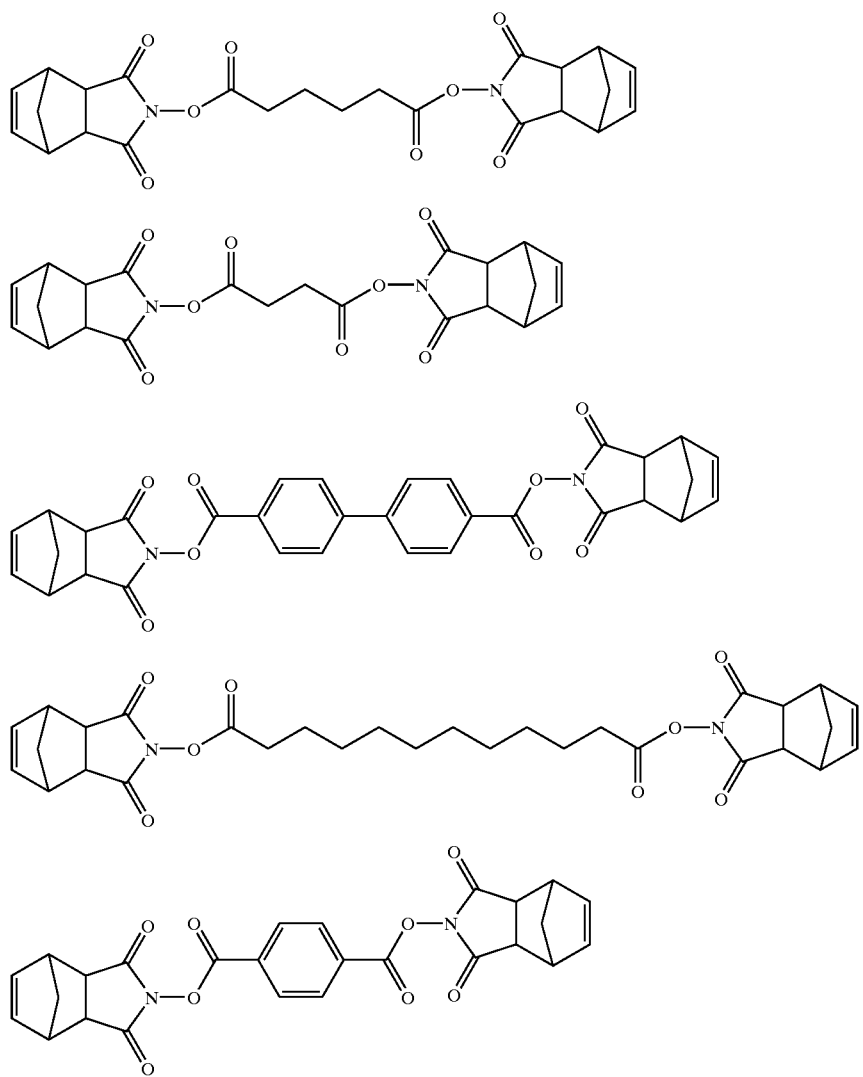

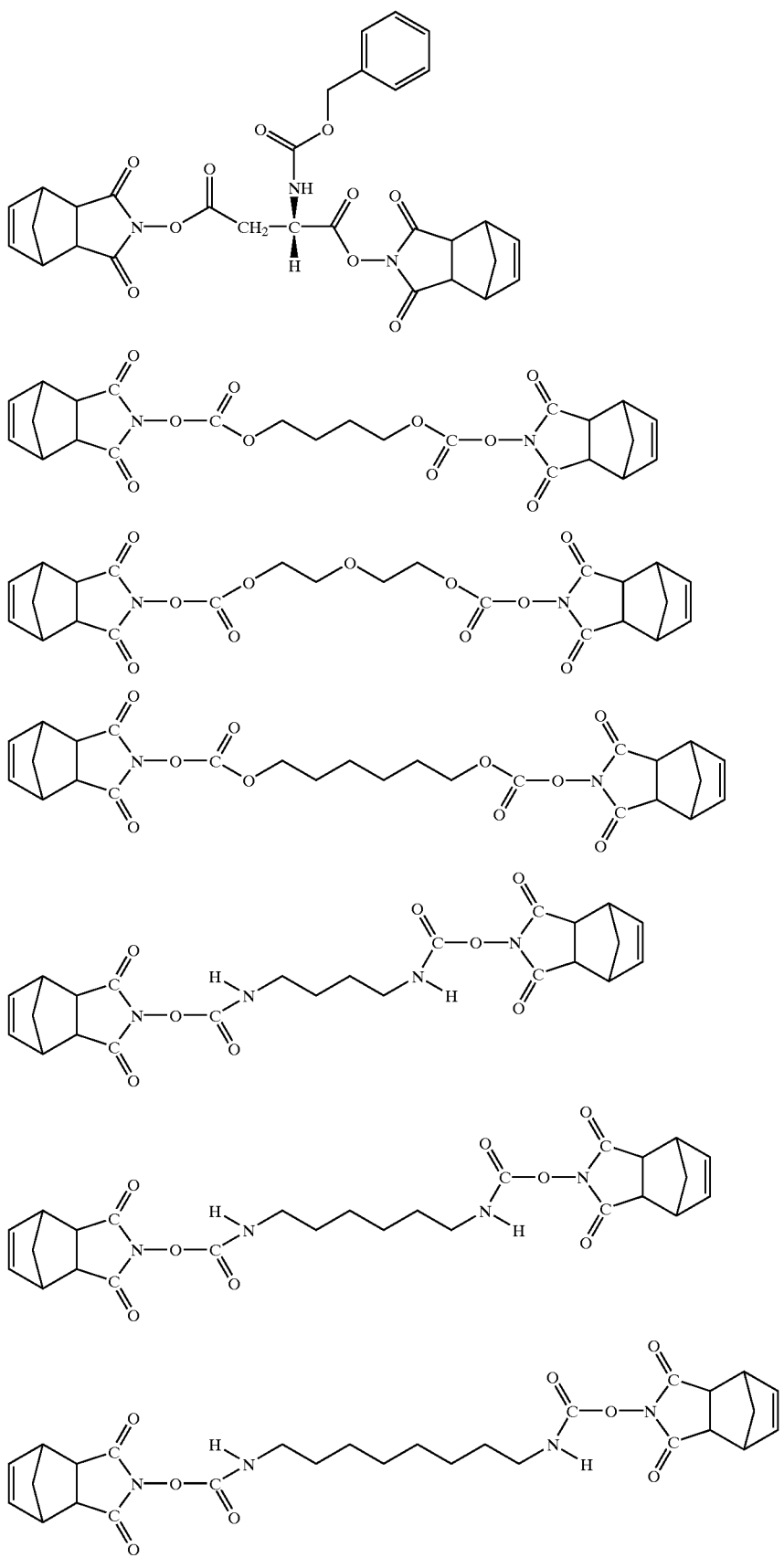

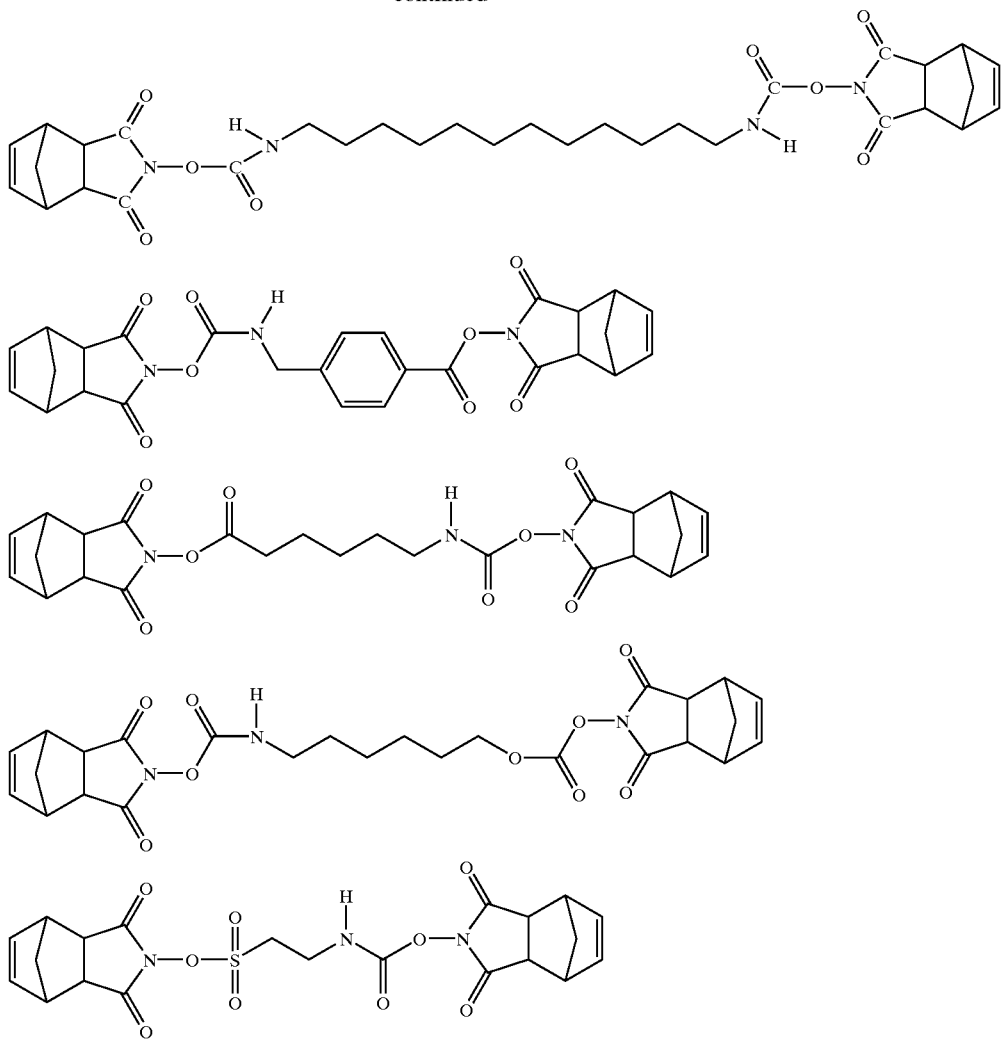

Further examples of low-molecular weight compounds are 1,3,5-benzenetricarboxylic acid, pentaerythritol, 1,3,5-triaminobenzene, melamine or cyclodextrin.

Further examples of low-molecular weight compounds having at least two functional groups are, inter alia, aminoalcohols, hydroxycarboxylic acids or amino acids such as, for example, the compound of the following structure (V)

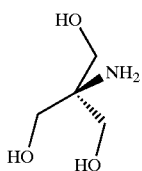

(V)

or the compound reacted with the compound of the structure (III), of the following structure (VI):

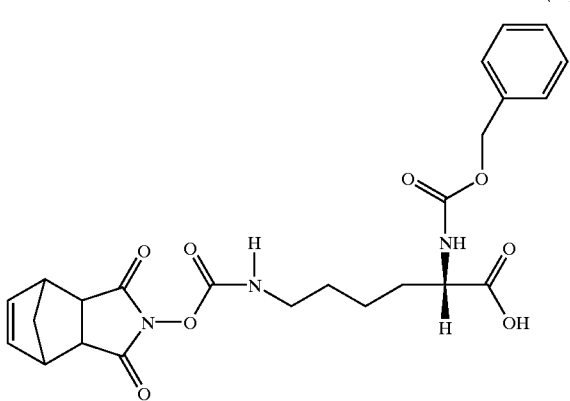

(VI)

or 2-aminoglycerol, gallic acid, 1-amino-3,5-dihydroxy-benzene, aminodicarboxylic acids, diaminocarboxylic acids, hydroxydicarboxylic acids, tri- or tetra-carboxylic acids.

Accordingly, the present invention also relates to a process, as described above, which is characterized in that at least one of the compounds having at least two functional groups has at least two different functional groups.

By means of suitable choice of the reaction conditions in the activation of the at least one functional group of the at least one low-molecular weight compound having at least two functional groups, with a compound of the structure (I) or (II), it is possible in the context of the process according to the invention that all functional groups of a low-molecular weight compound are activated and reacted with non-activated functional groups of at least one further compound having at least two functional groups. This is possible both for low-molecular weight compounds which only have one type of functional group, and for those which comprise two or more different types of functional groups.

In the context of the process according to the invention, it is in particular possible selectively to activate one or more functional groups of a low-molecular weight compound. Moreover, it is possible that the low-molecular weight compound has only one type of functional groups and, of these functional groups, only a certain selection is selectively activated.

Preferably, low-molecular weight compounds are employed in the process according to the invention which have two or more different functional groups, of which at least one is activated in the reaction of the compound with a compound of the structure (I) or (II). An example which may be mentioned among many possible compounds which result from the reaction of low-molecular weight compounds having two or more different functional groups, with one of the compounds (I) or (II) is the compound of the following structure (VII):

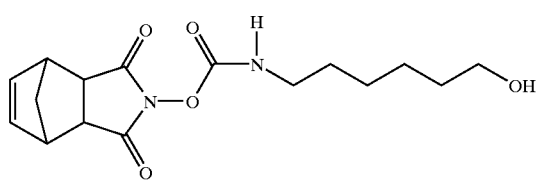

(VII)

The present invention accordingly also relates to a process, as described above, which is characterized in that at least one of the at least two different functional groups of the at least one compound having at least two functional groups has been selectively activated by a compound of the structure (I) or (II).

In the context of the process according to the invention, there are numerous possibilities here of achieving the selective activation of the functional groups. Thus, for example, it is possible, by means of the suitable choice of the solvent or of the solvents in which the activation is carried out, to achieve selectivity. Likewise, it is possible, by means of the specific choice of reaction temperature, reaction pressure or pH at which the reaction is carried out, to adjust the selectivity. A further possibility of setting a desired selectivity is the suitable choice of the activating reagent of the structure (I) or (II). Here, the differing reactivity and/or selectivity of one or more different functional groups with respect to one or more different activating reagents can be utilized. Obviously, it is possible in the context of the process according to the invention to achieve a selective activation of functional groups by suitable combination of the possibilities mentioned.

The two or more low-molecular weight compounds reacted with one another in the process according to the invention can be identical to or different from one another.

In particular, it is possible, for example, to employ only one type of low-molecular weight compounds which, for example, have two different types of functional groups, of which in turn one has been selectively activated. In this case, for example, the activated groups of the low-molecular weight compound react with the non-activated functional groups of this compound in the reaction.

It is further possible to employ two different low-molecular weight compounds which in each case only have one type of functional groups. In this case, it is possible, for example, to activate the functional groups of the one compound with a compound of the structure (I) or (II) and to react them with the non-activated functional groups of the other compound.

Obviously, it is also possible in the process according to the invention to employ more than two different low-molecular weight compounds and to prepare an essentially unrestricted multiplicity of condensation compounds by suitably carrying out the process by means of suitable, optionally selective activation of functional groups of the various compounds.

In addition, condensation compounds having largely any desired degrees of condensation can also be prepared in the process according to the invention. Accordingly, oligocondensation compounds and/or polycondensation compounds can be synthesized in the process according to the invention. The term "condensation compound", as is used in the present invention, therefore designates condensation compounds which have been synthesized from at least two low-molecular weight compounds.

The process according to the invention here is not restricted to the exclusive use of low-molecular weight compounds having at least two functional groups. Obviously, it is also possible to employ in addition to the at least two low-molecular weight compounds having at least two functional groups and which are reacted according to the invention, also at least one non-low-molecular weight compound which has at least one functional group, and/or at least one low-molecular weight compound which has one functional group. The term "non-low-molecular weight compound" here comprises compounds having a molar mass of greater than or equal to 1000 daltons.

The process according to the invention is furthermore not restricted to the use of the activating reagents of the structures (I) or (II). Thus it is possible, for example, that in at least one step according to the invention two compounds in each case having at least two functional groups are reacted with one another, and in one or more further steps the activation of functional groups for the synthesis of the condensation compound by means of other activating reagents takes place. Obviously, it is also possible that in one or more steps in the synthesis of the condensation compound two functional groups are reacted with one another without use of an activating reagent.

The specific embodiment of carrying out the process in the synthesis of the condensation compound is essentially subject to no restrictions and is possible in principle according to all possible methods.

A particular embodiment of the present invention relates to a process, as described above, which is characterized in that the condensation compound is prepared by simultaneous reaction of the low-molecular weight compounds having at least two functional groups.

In the context of the process according to the invention, it is also possible for one or more condensation compounds prepared according to the invention to be reacted in this one-pot process with at least one further low-molecular weight and/or non-low-molecular weight compound having at least one functional group.

It is further possible, for example, for the low-molecular weight and/or non-low-molecular weight compounds used for the reaction already to be mixed together in activated form. Likewise, it is also possible to mix together the low-molecular weight or non-low-molecular weight compounds in non-activated form and directly to carry out the activation by means of a compound of the structure (I) or (II) in the reaction vessel.

In the case in which at least two different compounds are reacted with one another, statisticas condensation compounds, for example, result.

A further embodiment of the present invention relates to a process, as described above, which is characterized in that the condensation compound is synthesized stepwise from the low-molecular weight compounds having at least two functional groups.

The stepwise synthesis can in principle be carried out here by all possible processes according to the prior art. Preferably, however, the stepwise synthesis is carried out in solution or on a solid support.

In a further embodiment, the present invention therefore relates to a process which is characterized in that the stepwise preparation of the condensation compound is carried out in solution or on a solid support.

If the condensation compound is synthesized on the solid support, it is possible in the context of the process according to the invention, for example, firstly to prepare according to the invention at least one condensation compound by reaction of at least two low-molecular weight compounds having at least two functional groups, to attach the resulting at least one condensation compound to the support by means of ionic and/or adsorptive and/or covalent bonding and further to synthesize the at least one condensation compound attached to the support via at least one free, optionally activated functional group by further reaction with at least one compound which has at least one functional, optionally activated group.

Likewise, it is possible firstly to attach at least one low-molecular weight or non-low-molecular weight compound having at least two functional groups to the support via ionic and/or adsorptive and/or covalent bonding and then to synthesize the condensation compound by further reactions on at least one optionally activated functional group of the low-molecular weight compound attached to the support, where in at least one step in the stepwise synthesis a condensation compound prepared according to the invention is employed.

In the context of the process according to the invention, it is also possible to combine these two reaction routes in any desired way.

Support materials which are suitable in principle are all materials to which, as described above, the at least one condensation compound and/or the low-molecular weight compound can be attached by ionic and/or adsorptive and/or covalent bonding and from which the condensation compound synthesized to the desired extent can be detached without destruction of the structure of the condensation compound.

In the context of the process according to the invention, it is possible here, for example, for the support not to influence the synthesis of the condensation compound. Likewise, it is also possible for the chemical nature and the topology of the support to be used, as a result of, for example, electronic or steric interactions, to influence the synthesis of the condensation compound, for example, regio-, stereo- or enantioselectively.

Examples which may be mentioned are porous and non-porous resins, titanium dioxide, silica gel, cellulose, glass beads, metal, plastic, ceramic or glass surfaces.

With respect to the solubility of the support in the selected solvent or solvent mixture, it is possible for the support material to be soluble or insoluble. Accordingly, it is possible in the context of the process according to the invention for the stepwise synthesis of the condensation compound on the support to take place in solution, in disperse phase or in emulsion.

It is further possible that in the course of the stepwise synthesis of the condensation compound on the support the solubility of the support-condensation compound complex changes in the chosen solvent or solvent mixture. Accordingly, it is possible, for example, in the course of the stepwise synthesis to change the solvent composition in order to guarantee the desired solubilities. Obviously, it is further possible to employ two or more support materials which are different from one another and which differ in their solubility in the chosen solvent or solvent mixture.

In a further possible embodiment of the process according to the invention, the support-condensation compound complex can be isolated after any desired number of steps and subsequently reacted again in the same or in another solvent or solvent mixture in at least one further step.

Likewise, the stepwise synthesis of the condensation compound can be carried out in solution without use of a support.

Just as in the stepwise preparation of the condensation compound on the support, it is possible to carry out the preparation of the condensation compound in solution without a support, depending on the compounds to be reacted and the chosen solvent or solvent mixture, in homogeneous solution or in dispersion or in emulsion.

In the stepwise synthesis of the condensation compound in solution without a support, it is possible in the context of the process according to the invention, for example, firstly to prepare a condensation compound from two low-molecular weight compounds having at least two functional groups and then to synthesize this condensation compound successively by reaction with in each case one further low-molecular weight or non-low-molecular weight compound having at least two functional groups. In each step, the condensation of at least one low-molecular weight compound or non-low-molecular weight compound takes place onto the condensation compound from the preceding step, at least one functional group of the condensation compound reacting with a functional group of a low-molecular weight compound in the condensation and, if appropriate, one of the two functional groups reacting with one another being activated before the reaction.

In particular, it is possible, for example, to employ an oligo- or polycondensation product prepared according to the invention as the non-low-molecular weight compound. Likewise, it is also possible to employ any desired oligomers or polymers which have a suitable type and number of functional groups as the non-low-molecular weight compound.

In principle, no restrictions exist with respect to the solvents or solvent mixtures which can be employed. It is only to be taken into consideration that the process according to the invention can be carried out in the selected solvent or solvent mixture. In a preferred embodiment of the process according to the invention, solvent mixtures are employed here, particularly preferably solvent mixtures which have water as one component.

Accordingly, the present invention also relates to a process, as described above, which is characterized in that it is carried out at temperatures in the range from −10° C. to +50° C. in at least one aqueous solvent mixture.

In the context of the process according to the invention, it is also possible to combine the methods described above in a suitable manner for the synthesis of the condensation compound.

Preferably, low-molecular weight compounds which carry functionally specific radicals or groups can be condensed linearly or in planar fashion or three-dimensionally between low-molecular weight or non-low-molecular weight blocks. Functionally specific radicals or groups which may be mentioned are, inter alia, chromophores, fluorophores, sensors, receptors or indicators. Moreover, for example, optically active radicals, groups which introduce a liquid-crystalline character, or groups having conductor or semiconductor properties can be introduced.

Corresponding to the possibilities described above of synthesizing oligo- and/or polycondensation compounds, it is possible in the context of the process according to the invention to prepare homo-oligocondensates or homo-polycondensates when using a single low-molecular weight compound. When using different compounds, co-oligo- or polycondensates, random co-oligo- or polycondensates, block co-oligo- or polycondensates or alternatively defined primary and secondary structures can also be prepared. It is possible here, using the differing reactivity and selectivity of the functional groups involved in the activation or the reaction, to control the sequence and the nature of the bonding steps.

With appropriate use and combination of compounds which have two or more than two functional groups, it is possible to synthesize one-, two- and/or three-dimensional structures by means of suitable activation and condensation steps.

Accordingly, the present invention also relates to the use of a compound of the following structure (I)

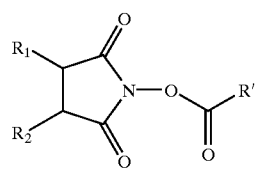

(I)

where R' is a halogen atom or a radical (I')

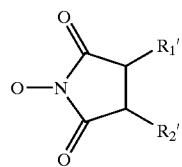

(I')

and where $R_1$, $R_2$, $R_1'$ and $R_2'$ are dentical or different and are hydrogen, straight-chain or branched-chain alkyl, aryl, cycloalkyl, heterocyclic or aralkyl radicals having up to 30 C atoms, or either $R_1$ and $R_2$ or $R_1'$ and $R_2'$ or both $R_1$ and $R_2$ and $R_1'$ and $R_2'$ are linked to give a carbocycle or a heterocycle, or of a compound of the following structure (II)

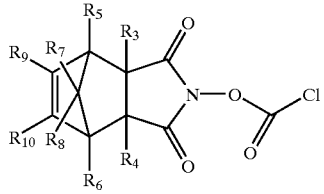

(II)

where $R_3$ to $R_{10}$ are identical or different and are hydrogen, straight-chain or branched-chain alkyl, aryl, cycloalkyl, heterocyclic and aralkyl radicals having up to 30 C atoms, or a number of $R_3$ to $R_{10}$ are bridged to give one or more carbo- or heterocycles, for the preparation of one-, two- and/or three-dimensional condensation compounds.

In the synthesis of these compounds, inter alia, ester, amide, carbonate, hydrazide, urethane or urea bonds can be linked to the abovementioned compounds of the structures (I) or (II) and the likewise abovementioned different functional groups by the process according to the invention.

The present invention therefore also relates to the use, as described above, which is characterized in that the one-, two- and/or three-dimensional condensation compounds are formed by linkage of ester, amide, carbonate, hydrazide, urethane or urea bonds or by linkage of thio-analogous or nitrogen-homologous bonds.

A particular advantage of the process according to the invention is to be seen in that even low-molecular weight compounds which carry substituents which react sensitively to drastic reaction conditions can be employed for the synthesis of the oligo- or condensation products, since the preparation conditions for these condensation compounds are less drastic compared with the processes according to the prior art.

Accordingly, the present invention relates to a process, as described above, which is characterized in that the reactions of the low-molecular weight compounds having at least two functional groups are carried out at a pH in the range from 3 to 14 and a temperature in the range from −30° C. to +70° C.

In a particularly preferred embodiment, the reactions are carried out at a pH in the range from 4 to 14 and at a temperature in the range from −15° C. to +50° C.

By using compounds which have two or more functional groups, it is possible to prepare star polymers, dendrons and dendrimers by the process according to the invention. Inter alia, both divergent and convergent synthesis strategies are possible here.

In the divergent synthesis, in a specific embodiment of the process according to the invention a multifunctional reagent such as a reagent of the structure (V), which, for example, is simply activated with a compound of the structure (I) or (II), is reacted with, for example, the hydroxy groups of a multifunctional nucleus. In a next step, in one embodiment of the process according to the invention the reaction product is activated on free functional groups with a compound of the structure (I) or (II) and then reacted with one or more suitable multifunctional reagents. In a preferred embodiment of the process according to the invention, in this next step the reaction product is reacted with one or more suitable multifunctional reagents which were activated with a compound of the structure (I) or (II).

In a further specific embodiment of the process according to the invention with respect to the divergent synthesis, the hydroxy groups or a multifunctional nucleus, for example, of a polyhydric alcohol, for example glycerol, are activated by means of a compound of the structure (I) or (II). In a next step, the activated hydroxy groups are reacted selectively with the amino groups, for example, of an aminoalcohol, for example, of the structure (V) to give the urethane. In further steps, the hydroxy groups of the condensation compound are then activated in each case and reacted with the amino groups of an amino alcohol to give urethane. The degree of branching can be controlled here via the number of the hydroxy groups in the nucleus and of the reagents employed in these further steps.

Inter alia, the following steps of a route for the synthesis of a dendrimer may be shown by way of example:

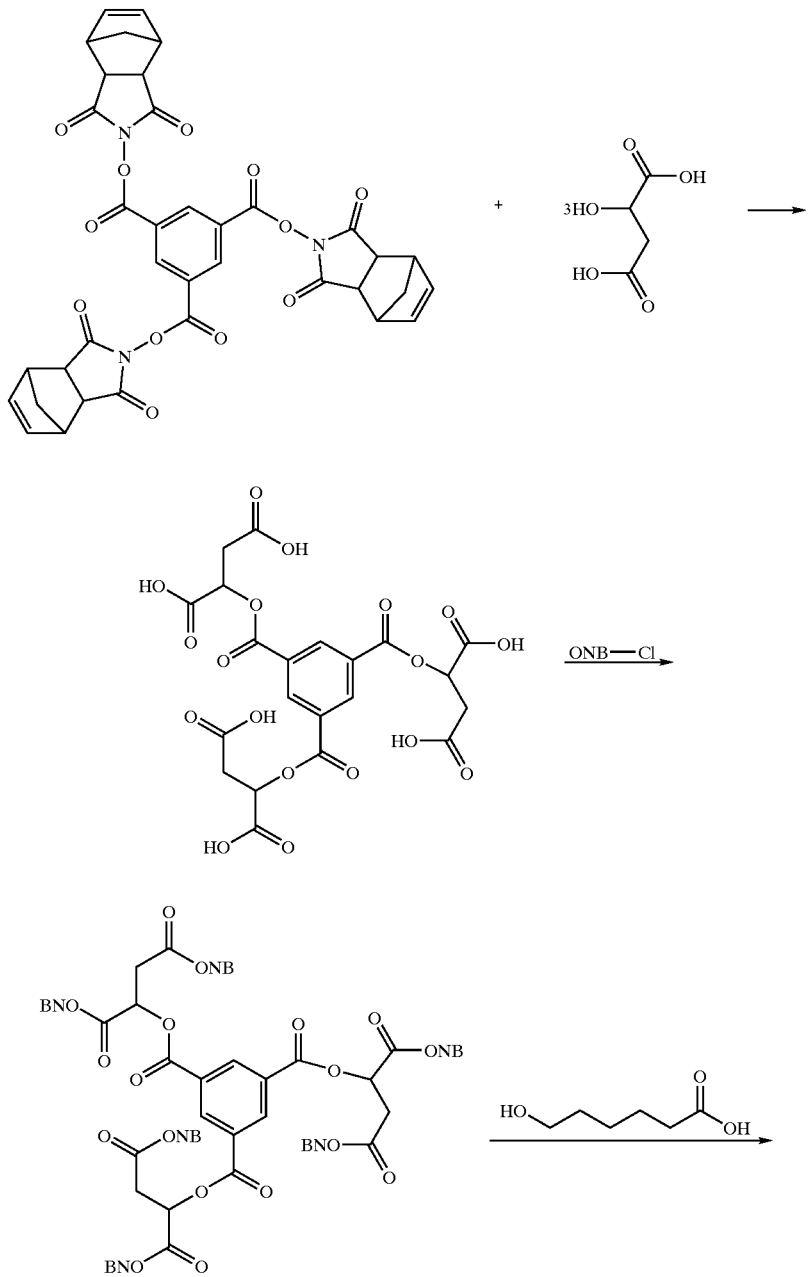

-continued

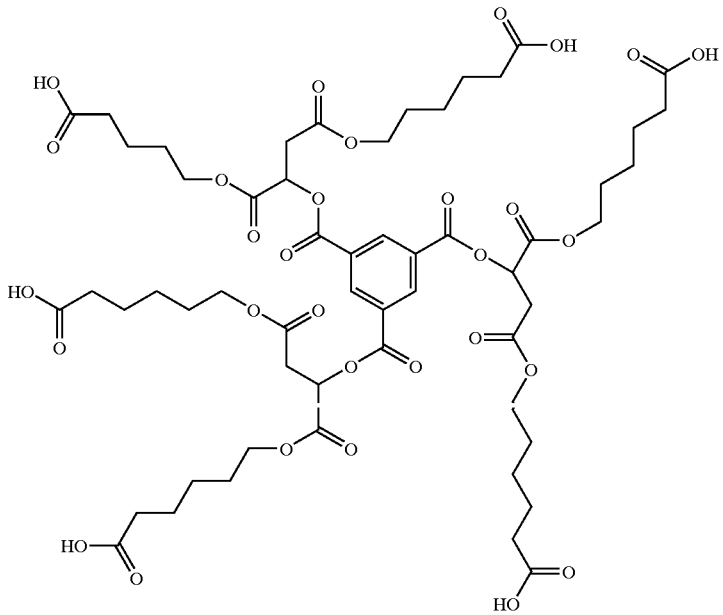

Accordingly, the present invention also relates to a use, as described above, which is characterized in that the condensation compounds are star polymers, dendrimers or dendrons.

In convergent synthesis, in a specific embodiment of the process according to the invention, for example, a hydroxydicarboxylic acid is selectively activated C-terminally with a compound of the structure (I) or (II), after which a condensation compound is successively synthesized up to the desired degree of derivatization using, for example, aminodicarboxylic acids. The condensation compound obtained, a dendron, can then be reacted, for example, with an activated tri- or tetracarboxylic acid.

Examples of nuclei which may be mentioned which are suitable for the preparation of star polymers or dendrimers are, inter alia, 1,3,5-benzenetricarboxylic acid, pentaerythritol, phloroglucinol, 1,3,5-triamino-benzene, melamine or alternatively cyclodextrins.

By means of the process according to the invention, all the types of bonding described above can be realized in the preparation of the star polymers, dendrons and dendrimers by means of condensation reactions.

A further advantage of the process according to the invention is to be seen, inter alia, in that the compounds from which the oligo- or condensation compounds are synthesized can additionally carry two further functional groups, i.e. can essentially be arbitrarily substituted, in addition to the functional groups which are used for the synthesis.

Here, it is possible inter alia that these further functional groups are protected, if appropriate, by a suitable protective group during the synthesis of the condensation compound. Essentially all known protective groups according to the prior art can be used here.

Following the oligo- or polycondensation, the condensation compound prepared can be derivatized on these functional groups, where in the case in which the functional groups were provided with protective groups, these are first removed by means of a suitable process according to the prior art. With respect to this derivatization, it is possible, for example, to activate the functional groups of the condensation compound with an activating reagent, preferably with a compound of the structure (I) or (II) and then to react it with compounds which have at least one functional group.

Likewise, it is also possible to react activated compounds having at least one functional group, with the functional groups of the condensation compound.

In a further embodiment of the present invention, it is possible to derivatize in a suitable manner identical oligomeric or polymeric condensation intermediates which in each case have at least one functional group which is not used for the synthesis of the condensation compound and then to mix them together to give a condensation compound. The condensation intermediates can in this case either be derivatized with a single or alternatively different compounds. The compounds with which derivatization is carried out can be supplied, for example, as a mixture, which finally leads to a randomly derivatized condensation product.

By means of the structure of substituents which are introduced into the condensation compound via the derivatization or which are present as radicals in the compounds from which the condensation compounds are synthesized, properties can be specifically introduced into the condensation compound in the process according to the invention.

For example, the solubility or the thermal or rheological behaviour of the condensation compound, for example the plasticity, the deformability, the heat stability or the glass temperature, can be influenced by the chemical nature of these substituents. Likewise, linear and non-linear optical properties such as liquid-crystalline character, chirality, refraction, scattering or transparency can be introduced into the condensation compound. The specific influencing of the conductivity of the condensation compound is also possible. Likewise, combinations of these properties, of course, are also specifically controllable. For example, it is possible to prepare by the process according to the invention polycondensation compounds in which the conductivity and the mechanical and thermal stability are specifically influenced by suitable selection, reaction, if appropriate derivatization and/or crosslinkage, as described below, of those compounds which are employed For the synthesis of the polycondensation compound. The substituents or radicals can likewise introduce indicator or sensor properties or alternatively colour, fluorescence or radioactivity into the condensation product.

In the context of the present invention, it is also possible to deform the optionally derivatized condensation products in the presence of a template compound. The template compound employed can in principle be any compound which can be intercalated reversibly into the structure to be synthesized, in the preparation of the condensation compounds.

Accordingly, the present invention also relates to a process, as described above, which is characterized in that the condensation compound is deformed in the presence of at least one template compound.

In the deformation, a procedure is used, for example, in which a condensation compound is mixed together with a template in a suitable solvent or solvent mixture and the condensation compound is given the possibility of taking up one or more favoured conformations. It is also possible here to mix together a condensation compound with two or more different templates.

Likewise, it is possible to mix together two or more different condensation compounds with one or more different templates.

The interactions between the at least one template compound and the condensation compound can be of any desired nature. Examples which may be mentioned are:

hydrogen bonds;

dipole-dipole interactions;

van der Waals interactions;

hydrophobic interactions;

charge-transfer interactions;

ionic interactions;

combinations of these interactions.

Structural units of the compounds from which the condensation compounds are synthesized, for example, can be responsible for the interactions. These structural units can also have been introduced into the condensation compound by derivatization, as described above. Inter alia, there can be functional groups which were not used for the synthesis of the condensation compounds or which were subsequently introduced into the condensation compound by derivatization, as described above.

In a further embodiment of the process according to the invention, the synthesis of the condensation compound is carried out in the presence of at least one chemical compound which is not incorporated into the condensation compound. This at least one chemical compound can here be, for example, a template.

Accordingly, the present invention also relates to a process, as described above, which is characterized in that the condensation compound is prepared in the presence of at least one template compound.

It is possible here, inter alia, that the at least one template compound is present during the entire preparation of the condensation compound. It is likewise possible to add the template compound only in the course of the preparation process.

In the context of the present invention, it is also possible to synthesize the condensation compound in the presence of at least one template compound and to deform the resulting conformation in a further step in the presence of at least one template compound.

In a further embodiment of the process according to the invention, the conformation of the condensation compound, which has been formed by deformation in the presence of a template or by preparation of the condensation compound in the presence of a template, is fixed. For fixing, in principle all the possible processes can be employed.

Accordingly, the present invention also relates to a process, as described above, which is characterized in that the conformation resulting from the deformation is fixed.

In particular, temperature change, solvent exchange and crosslinkage may be mentioned here. The conformation is preferably fixed by crosslinkage.

The crosslinkage can be achieved here, for example, by directly reacting two or more strands of condensation compounds with one another. This can be achieved by constituting the functional groups of the compounds from which the condensation compound was synthesized and/or the functional groups introduced by derivatization such that covalent and/or non-covalent bonds can be connected between these groups. Very generally, it is possible that these covalent and/or non-covalent bonds are formed between groups which are attached to a single condensation compound, and/or are formed between groups which are attached to two or more condensation compounds, so that two or more condensation compounds can be linked to one another via one or more sites by means of the crosslinkage.

Likewise, it is also possible to employ one or more suitable crosslinking agent(s) for the crosslinkage, with which, as described above, groups within a condensation compound and/or groups which are attached to a number of strands of condensation compounds which, if appropriate, are different can be crosslinked in a covalent and/or non-covalent manner.

Here, it is particularly possible in the context of the present invention to design the chemical structure of the condensation compound with respect to the later crosslinkage as early as during the preparation of the condensation compound and/or during the derivatization of the condensation compound or the condensation intermediates. In particular, for example, the derivatizing reagents can have functional groups which are selective for covalent and/or non-covalent crosslinkage.

Possible crosslinking reagents are in principle all suitable compounds known from the prior art. Accordingly, the crosslinkage can be carried out, for example, in a covalently reversible manner, in a covalently irreversible manner or in a non-covalent manner, where, in the case of crosslinkage in a non-covalent manner, for example, crosslinkages via ionic interaction or via charge-transfer interaction may be mentioned.

As crosslinking reagents which can lead to covalently irreversible crosslinkage, inter alia, bi- or polyfunctional compounds such as diols or diamines may be mentioned. Here, for example, bivalent crosslinkers are reacted with the activated condensation compound, or the at least bivalent activated crosslinking reagent is reacted with the non-activated condensation compound. A covalently reversible crosslinkage can be realized, for example, by formation of a sulphur-sulphur bond to give a disulphide bridge between two functional groups attached to one or two condensation compounds. Crosslinkage via ionic interaction can take place, for example, via two radicals, of which one has a quaternary ammonium ion as a structural unit and the other has, for example

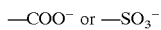

as a structural unit. Crosslinkage via hydrogen bridges can be formed, for example, between two complementary base pairs, for example via the following structure:

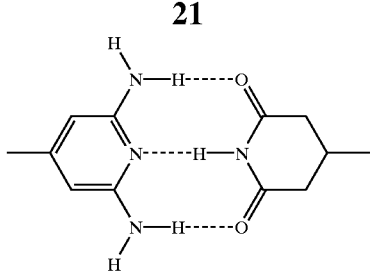

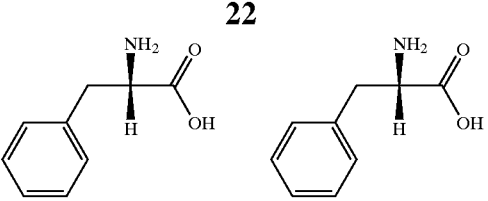

Very generally, polymer derivatives to be crosslinked non-covalently can be synthesized in complementary form with respect to the crosslinking sites, structural units complementary to one another being, for example, acid/triamine or uracil/melamine. Likewise, in the case of a non-covalent crosslinkage, the crosslinking reagent can be complementary to the crosslinking sites on the condensation compound. An example of this which may be mentioned would be an amine group on the condensation compound and a dicarboxylic acid as a crosslinking reagent.

By means of the crosslinkage, it is possible, for example, to synthesize multilayers from suitable condensation products. This is possible, for example, if firstly two-dimensional structures are synthesized by the process according to the invention and these are connected by crosslinkage to give multilayers. Likewise, it is possible firstly to prepare one-dimensional structures from which two-dimensional structures are prepared by crosslinkage and subsequently three-dimensional structures are prepared by crosslinkage. Likewise, three-dimensional structures can be synthesized directly from suitable one-dimensional structures by crosslinkage. A combination of these preparation routes is likewise possible.

In a further embodiment, the present invention also relates to the use of a condensation compound, which can be prepared according to a process as described above, or of a condensation compound, which can be prepared by the use of a compound of the structure (I) or (II), as described above, as a crosslinking reagent.

Essentially, all suitable compounds can be crosslinked by the use according to the invention. Suitable compounds here are those compounds which have at least one structural unit, for example one functional group, which interacts with a structural unit, for example a functional group, of the condensation compound prepared according to the invention in such a way that a crosslinkage takes place.

Inter alia, it is possible here to crosslink two or more oligomers and/or polymers with one another by means of at least one condensation compound prepared according to the invention. The oligomers or polymers here can have a one-, two- or three-dimensional structure. Obviously, it is possible that at least one oligomer and/or polymer to be crosslinked is a condensation compound prepared according to the invention.

Depending on the number of the structural units suitable for crosslinkage of the at least one condensation compound prepared according to the invention and used as a crosslinking reagent, it is possible to crosslink two or more compounds which are identical to or different from one another, with one another.

An example of a crosslinking reagent to be used according to the invention and which may be listed below is a dimeric crosslinker which is prepared from phenylalanine and leucine by the process according to the invention:

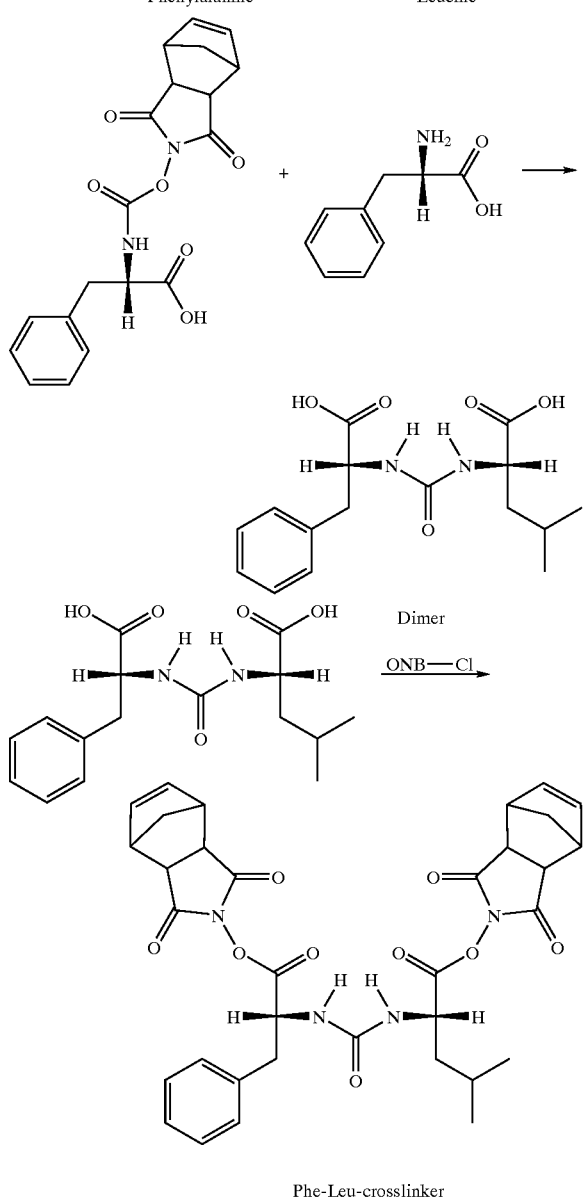

The following reaction routes (A) and (B) may be listed as examples of the synthesis of a condensation compound by the process according to the invention, in which reaction routes the radical BNO represents the following structural unit (VIII):

(VIII)

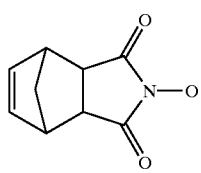

Reaction route (A):
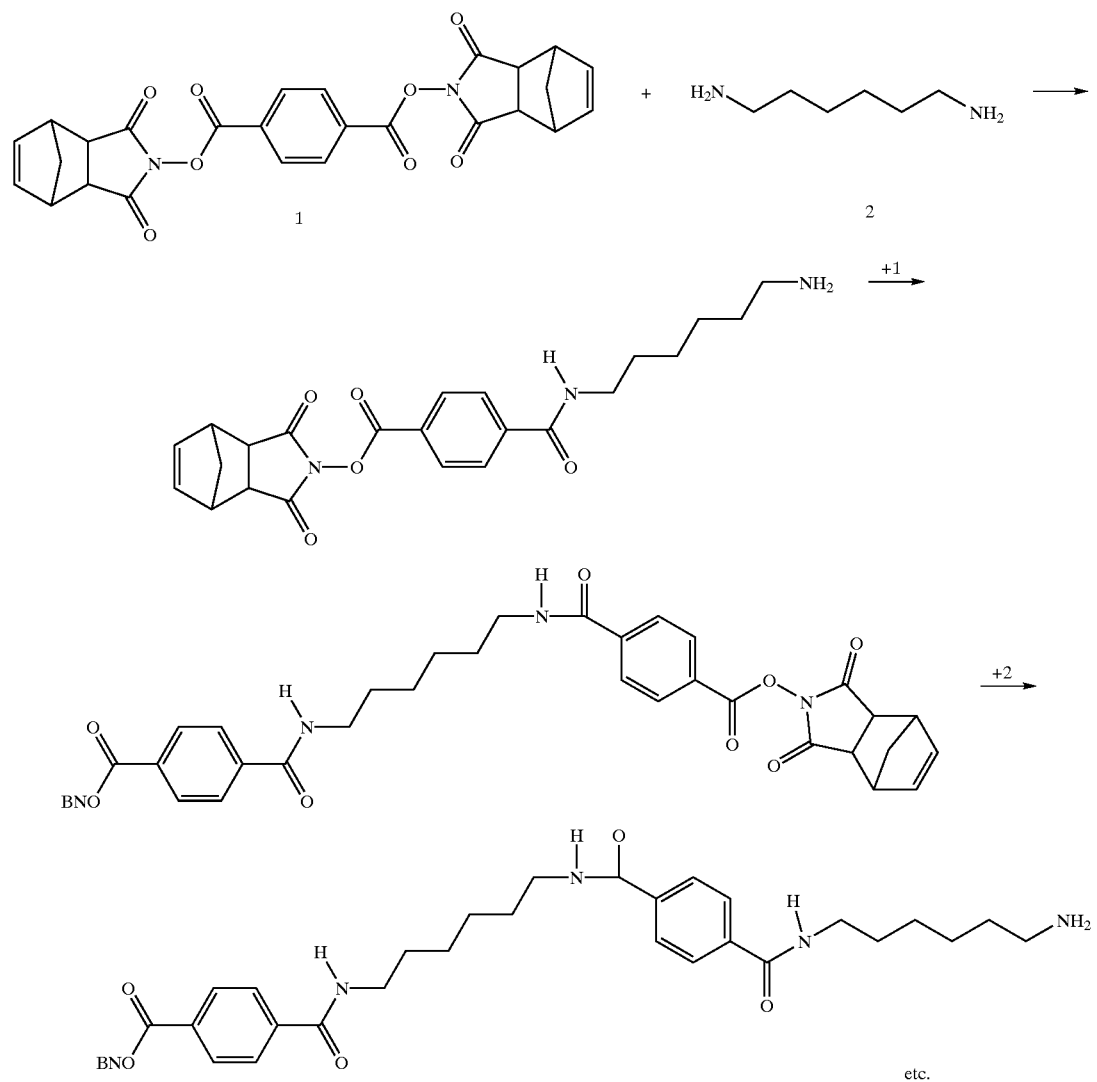
Reaction route (B):
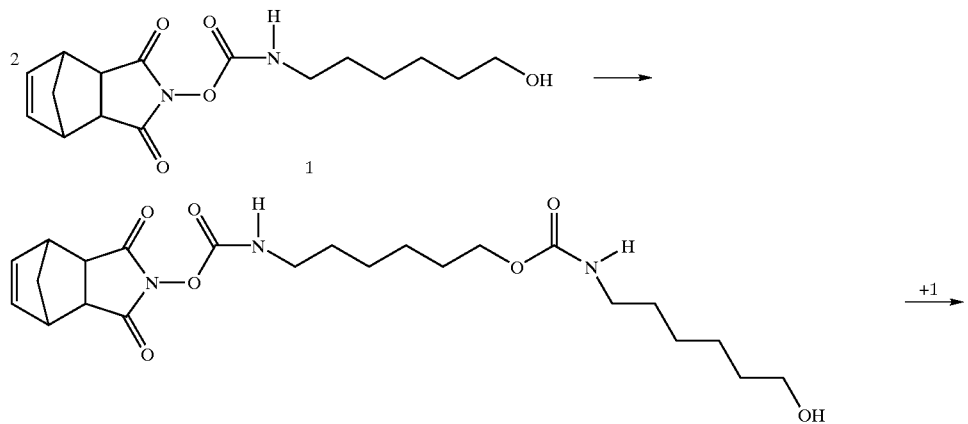

-continued

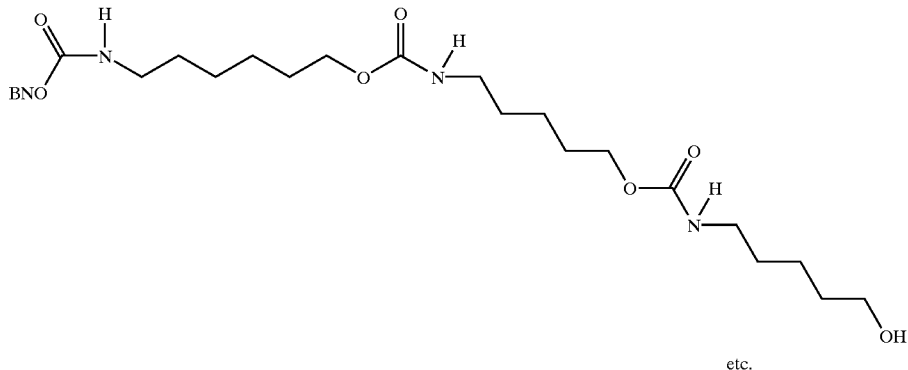

etc.

EXAMPLES

Example 1

Polycondensation of terephthalic acid bis(N-hydroxy-5-norbornene-2,3-dicarboximide) ester with 1,6-diaminohexane A solution of 0.58 g (5 mmol) of 1,6-diaminohexane in 100 ml of chloroform was added dropwise at room temperature in the course of 1 h to a solution of 2.44 g (5 mmol) of terephthalic acid bis(N-hydroxy-5-norbornene-2,3-dicarboximide) ester in 150 ml of chloroform. After about 25% of the amount of 1,6-diaminohexane had been added, the solution began to become turbid, and a white precipitate was formed. The reaction mixture was stirred at room temperature until it was no longer possible to detect starting materials using TLC checking. The precipitate was filtered off through a Teflon membrane and dried in a high vacuum for 48 h.

Example 2

Condensation of trimesic acid tris(N-hydroxy-5-norbornene-2,3-dicarboximide) ester with 1,6-aminohexanol A solution of 2.00 g (17.1 mmol) of 1,6-aminohexanol in a mixture of 10 ml of THF and 3 ml of ethanol was added dropwise at room temperature in the course of 10 min to a solution of 3.95 g (5.7 mmol) of trimesic acid tris(N-hydroxy-5-norbornene-2,3-dicarboximide) ester in 100 ml of THF. After 2 hours, the activated trimesic acid had reacted (TLC checking) and the solvent was removed on a rotary evaporator. The brown residue was chromatographed on silica gel (hexane/ethyl acetate) for the purification and removal of the N-hydroxy-5-norbornene-2,3-dica-boximide formed.

Example 3

Preparation of C6-diol bis-ONB

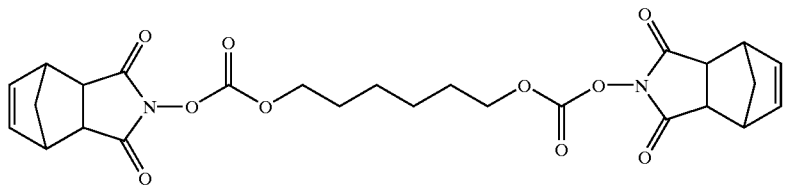

6.03 g (25 mmol) of N-(chlorocarbonyloxy)-5-norbornene-2,3-dicarboximide were dissolved in 250 ml of tetrahydrofuran. A solution of 1.18 g (10 mmol) of 1,6-hexanediol and 1.98 g (25 mmol) of pyridine in 80 ml of tetrahydrofuran was added dropwise at 10° C. in the course of 1 h. The mixture was stirred at 20° C. for 1 h and at 35° C. for 3 h. The precipitated pyridinium hydrochloride was filtered off and the tetrahydrofuran was removed on a rotary evaporator. The residue was taken up in 100 ml of dichloromethane and shaken with 5% strength $KHSO_4$ solution, with 5% strength $NaHCO_3$ solution and with distilled water. The organic phase was concentrated after drying over $Na_2SO_4$ and the residual colourless crystals were dried in a high vacuum. Yield: 3.57 g (71.4%).

5.30 g (22 mmol) of N-(chlorocarbonyloxy)-5-norbornene-2,3-dicarboximide and 0.24 g (2 mmol) of 4-dimethyl-aminopyridine were dissolved in 250 ml of dichloromethane. A solution of 1.46 g (10 mmol) of adipic acid and 2.22 g (22 mmol) of triethylamine in 50 ml of dichloromethane was added dropwise at 0° C. in the course of 1 h. The mixture was stirred at 0° C. for 1 h, at 20° C. for 1 h and at 35° C. for 2 h. The reaction solution was shaken with 5% strength $KHSO_4$ solution, with 5% strength $NaHCO_3$ solution and with distilled water. The organic phase was concentrated after drying over $Na_2SO_4$ and the residue was dried in a high vacuum.

Example 4

Preparation of C8-diamine bis-ONB

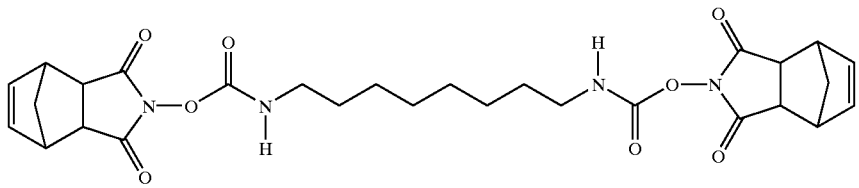

6.02 g (25 mmol) of N-(chlorocarbonyloxy)-5-norbornene-2,3-dicarboximide were dissolved in 250 ml of dichloromethane. A solution of 1.47 g (10 mmol) of 1,8-diaminooctane and 3.03 g (30 mmol) of triethylamine in 100 ml of dichloromethane was added dropwise at −15° C. in the course of 1 h. The mixture was stirred at −15° C. for 4 h. Some of the product precipitated as a white solid and was filtered off. The filtered reaction solution was shaken with 5% strength $KHSO_4$ solution, with 5% strength $NaHCO_3$ solution and with distilled water. The organic phase was concentrated after drying over $Na_2SO_4$ and the residual white crystals were dried in a high vacuum. The total yield of both fractions was 4.75 g (85.6%).

Example 5

Preparation of adipic acid bis-ONB

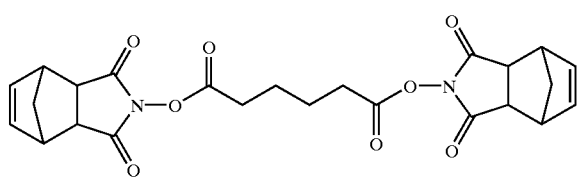

Example 6

Preparation of terephthalic acid bis-ONB

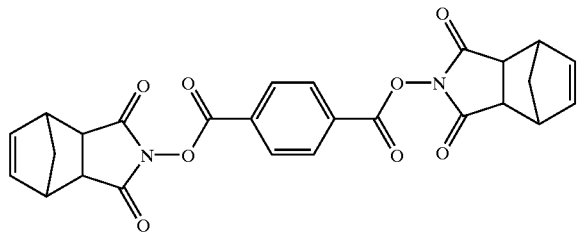

26.51 g (110 mmol) of N-(chlorocarbonyloxy)-5-norbornene-2,3-dicarboximide and 1.22 g (11 mmol) of 4-dimethylaminopyridine were dissolved in 500 ml of dichloromethane. A solution of 8.30 g (50 mmol) of terephthalic acid and 11.1 g (110 mmol) of triethylamine in 150 ml of dichloromethane was added dropwise at 0° C. in the course of 2 h. The mixture was stirred at 0° C. for 1 h, at 20° C. for 1 h and at 35° C. for 2 h. 400 ml of dichloromethane were added to the resulting suspension and the now clear reaction solution was shaken with 5% strength $KHSO_4$ solution, with 5% strength $NaHCO_3$ solution and with distilled water. The organic phase was concentrated after drying over $Na_2SO_4$ and the white residue was dried in a high vacuum. Yield: 17.15 g (70.2%).

Example 7

Preparation of 1-amino-6-hexanol di-ONB

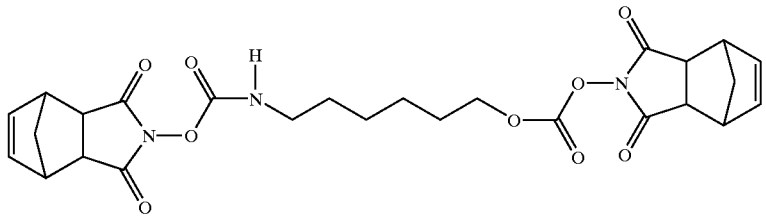

2.65 g (11 mmol) of N-(chlorocarbonyloxy)-5-norbornene-2,3-dicarboximide were dissolved in 150 ml of dichloromethane. A solution of 1.14 g (10 mmol) of 1,6-aminohexanol and 1.31 g (13 mmol) of triethylamine in 40 ml of dichloromethane and 30 ml of chloroform was added dropwise at −15° C. in the course of 30 min. The mixture was stirred at −15° C. for 3 h and excess N-(chlorocarbonyloxy)-5-norbornene-2,3-dicarboximide was hydrolysed using 2 ml of water. The clear reaction solution was shaken with 5% strength $KHSO_4$ solution, with 5% strength $NaHCO_3$ solution and with distilled water. The organic phase was concentrated after drying over $Na_2SO_4$ and the colourless gelatinous residue was dried in a high vacuum.

Example 8

Preparation of 12-hydroxydodecanoic acid di-ONB

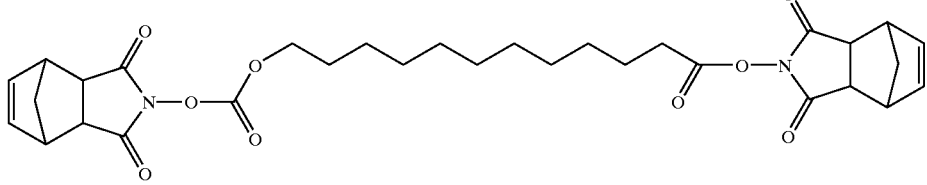

1.08 g (5 mmol) of 12-hydroxydodecanoic acid and 1.52 g (15 mmol) of triethylamine were dissolved in 400 ml of dichloromethane, together with 0.12 g (1 mmol) of 4-dimethylaminopyridine. 2.89 g (12 mmol) of N-(chlorocarbonyloxy)-5-norbornene-2,3-dicarboximide were added dropwise at 0° C. in the course of 30 min. The mixture was stirred at 0° C. for 1 h and at 15° C. for 1.5 h. The reaction solution was shaken with ice-cold 5% strength $NaHCO_3$ solution and with ice-cold distilled water. The organic phase was concentrated after drying over $Na_2SO_4$ and the residue was taken up in methylene chloride. The product was precipitated again using hexane and dried in a high vacuum. Yield: 2.8 g (96.1%).

Example 9

Preparation of trimesic acid tris-ONB

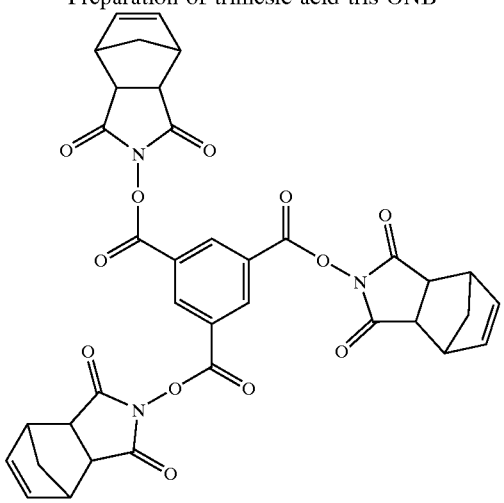

38.56 g (160 mmol) of N-(chlorocarbonyloxy)-5-norbornene-2,3-dicarboximide were dissolved in 400 ml of dichloromethane, together with 0.61 g (5 mmol) of 4-dimethylaminopyridine. A solution of 10.50 g (50 mmol) of trimesic acid (1,3,5-benzenetricarboxylic acid) and 16.16 g (160 mmol) of triethylamine in 150 ml of dichloromethane was added dropwise at 0° C. in the course of 30 min. The mixture was stirred at 0° C. for 1 h, at 20° C. for 1 h and at 35° C. for 2 h. Evolution of $CO_2$ occurred in the course of this. The reaction solution was shaken with 5% strength $KHSO_4$ solution, with 5% strength $NaHCO_3$ solution and with distilled water. The organic phase was concentrated after drying over $Na_2SO_4$ and the residual colourless crystals were dried in a high vacuum. Yield: 26.8 g (77.3%).

Example 10

Selective mono-reaction of 1-amino-6-hexanol di-ONB with isobutylamine

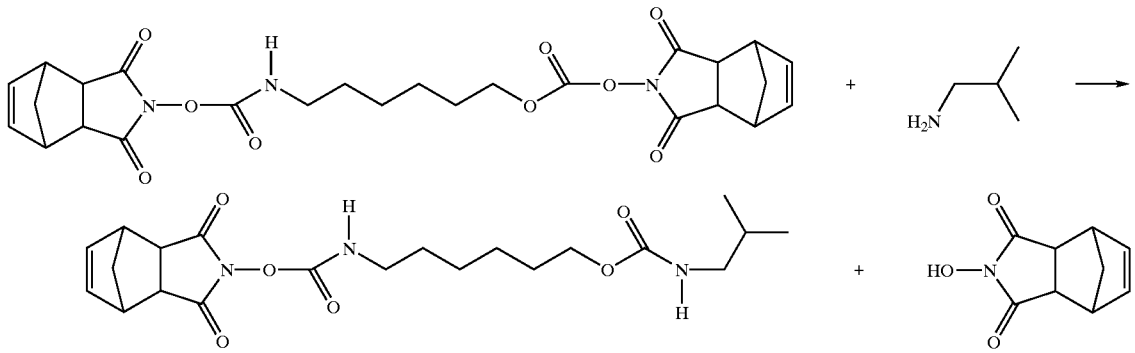

0.53 g (1.0 mmol) of 1-amino-6-hexanol di-ONB was dissolved in 20 ml of dichloromethane. 0.07 g (1.0 mmol) of isobutylamine was rapidly added dropwise at room temperature. The mixture was stirred at room temperature for 90 min. Without restriction to theory, it is presently assumed that the isobutylamine reacts selectively here with the activated alcohol function. The reaction solution was shaken with 5% strength $KHSO_4$ solution, with 5% strength $NaHCO_3$ solution and with distilled water. The organic phase was concentrated after drying over $MgSO_4$ and the colourless gelatinous residue was dried in a high vacuum. Yield: 0.30 g (71.2%).

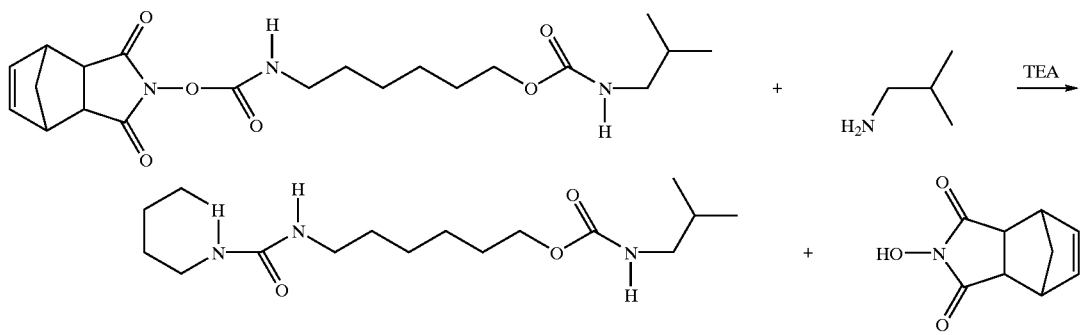

0.20 g (0.47 mmol) of the mono-reaction product obtained as described above was dissolved in 15 ml of dichloromethane and 0.04 g (0.57 mmol) of triethylamine was added. In the presence of triethylamine, the activated amine function reacts within 60 min. The reaction solution was shaken with 5% strength $KHSO_4$ solution, with 5% strength $NaHCO_3$ solution and with distilled water. The organic phase was concentrated after drying over $MgSO_4$ and the colourless crystals were dried in a high vacuum. Yield: 0.10 g (67.5%).

What is claimed is:

1. Process for the preparation of a condensation compound by reaction of at least one functional group of a first low-molecular weight compound having at least two functional groups, with at least one functional group of at least one further, second low-molecular weight compound having at least two functional groups, and which can be identical to the first or different from the first low-molecular weight compound, with obtainment of a condensation compound, characterized in that at least one of the functional groups involved in this reaction has been activated before the reaction by reaction with a compound of the following structure (I)

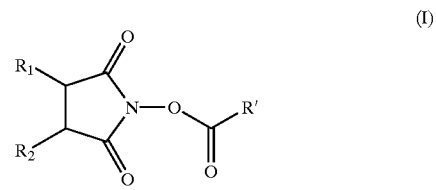

where R' is a halogen atom or a radical (I')

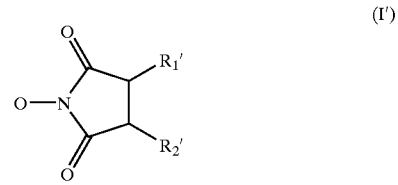

and where $R_1$, $R_2$, $R_1'$ and $R_2'$ are identical or different and are hydrogen, straight-chain or branched-chain alkyl, aryl, cycloalkyl, hetero-cyclic or aralkyl radicals having up to 30 C atoms, or either $R_1$ and $R_2$ or $R_1'$ and $R_2'$ or both $R_1$ and $R_2$ and $R_1'$ and $R_2'$ are linked to give a carbocycle or a heterocycle.

2. Process according to claim 1, characterized in that the compound of the structure (I) employed is a compound of the following structure (II)

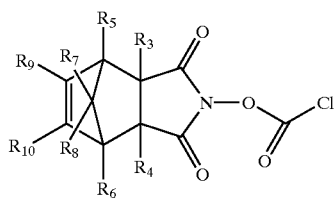

(II)

where $R_3$ to $R_{10}$ are identical or different and are hydrogen, straight-chain or branched-chain alkyl, aryl, cycloalkyl, heterocyclic and aralkyl radicals having up to 30 C atoms, or a number of $R_3$ to $R_{10}$ are bridged to give one or more carbocycles or heterocycles.

3. Process according to claim 1, characterized in that at least one of the compounds having at least two functional groups has at least two different functional groups.

4. Process according to claim 3, characterized in that at least one of the at least two different functional groups of the at least one compound having at least two functional groups was selectively activated by a compound of the structure (I) or (II).

5. Process according to claim 1, characterized in that the condensation compound is prepared by simultaneous reaction of the compounds having at least two functional groups.

6. Process according to claim 1, characterized in that the condensation compound is synthesized stepwise from the compounds having at least two functional groups.

7. Process according to claim 6, characterized in that the stepwise preparation of the condensation compound is carried out in solution or on a solid support.

8. Process according to claim 1, characterized in that the reactions of the compounds having at least two functional groups are carried out at a pH in the range from 3 to 14 and a temperature in the range from −30° C. to +50° C.

9. Process according to claim 1, characterized in that it is carried out at temperatures in the range from −10° C. to +50° C. in at least one aqueous solvent mixture.

10. Process according to claim 1, characterized in that the condensation compound is prepared in the presence of at least one template compound.

11. Process according to claim 1, characterized in that the condensation compound is deformed in the presence of at least one template compound.

12. Process according to claim 10, characterized in that the conformation resulting from the preparation or the deformation is fixed.

13. A method for preparing a condensation compound comprising at least the step of bringing at least one functional group in contact with a compound of the following structure (I)

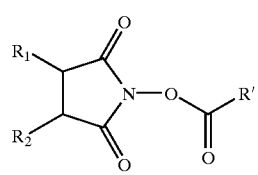

(I)

where R' is a halogen atom or a radical (I')

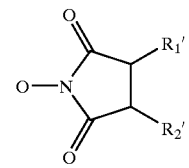

(I')

and where $R_1$, $R_2$, $R_1'$ and $R_2'$ are identical or different and are hydrogen, straight-chain or branched-chain alkyl, aryl, cycloalkyl, heterocyclic or aralkyl radicals having up to 30 C atoms, or either $R_1$ and $R_2$ or $R_1'$ and $R_2'$ or both $R_1$ and $R_2$ and $R_1'$ and $R_2'$ are linked to give a carbocycle or a heterocycle, or of a compound of the following structure

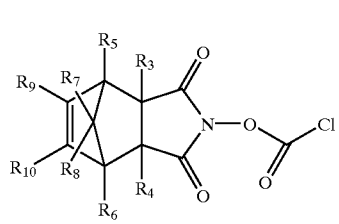

(II)

where $R_3$ to $R_{10}$ are identical or different and are hydrogen, straight-chain or branched-chain alkyl, aryl, cycloalkyl, heterocyclic and aralkyl radicals having up to 30 C atoms, or a number of $R_3$ to $R_{10}$ are bridged to give one or more carbocycles or heterocycles.

14. A method according to claim 13, further comprising forming one-, two- and/or three-dimensional condensation compounds by linkage of ester, amide, carbonate, hydrazide, urethane or urea bonds and the thio analogues or nitrogen homologues of these compounds.

15. A method according to claim 13, wherein the condensation compounds are star polymers, dendrimers or dendrons.

16. A method for preparing a condensation compound comprising crosslinking a compound of the structure (I) or (II) according to claim 13.

17. A method for preparing a condensation compound comprising crosslinking a compound of the structure (I) or (II) according to claim 14.

18. A method for preparing a condensation compound comprising crosslinking a compound of the structure (I) or (II) according to claim 15.

* * * * *